Oct. 3, 1933.    R. MAUTSCH    1,929,365
HEAT EXCHANGE APPARATUS
Filed July 22, 1931
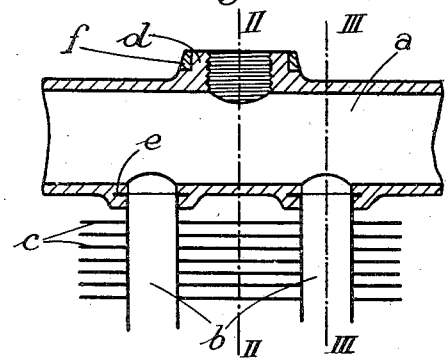
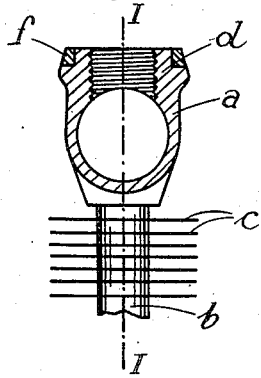
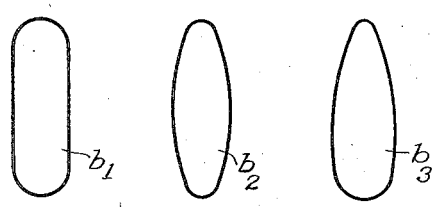
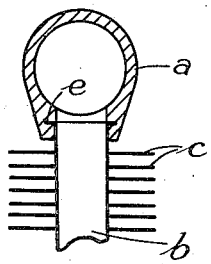
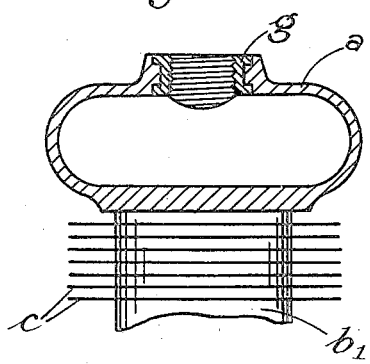
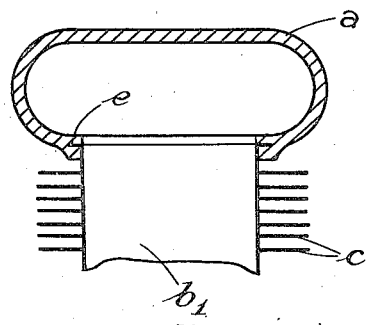
Inventor:
R. Mautsch
By [signature]
Atty.

Patented Oct. 3, 1933

1,929,365

UNITED STATES PATENT OFFICE 1,929,365

HEAT EXCHANGE APPARATUS

Robert Mautsch, Brussels, Belgium

Application July 22, 1931, Serial No. 552,478, and in Belgium July 30, 1930

2 Claims. (Cl. 257—263)

This invention relates to heat exchange apparatus, the ends of whose units, of tubular or other shape, are joined to headers connected with the supply of the fluid flowing through the apparatus. The units and the headers are usually joined by expansion or by means of threaded nipples but, apart from being costly, such joints frequently have the disadvantage of springing leaks, which only appear after the apparatus is in use. Furthermore, they are only adapted for connecting up tubes or pipes of circular cross-section.

It has been proposed likewise to join the units and headers by soldering or welding, but autogenous welding is applicable to a limited number of metals only and ordinary soldering is neither strong nor safe. Moreover, although soldering and welding processes are expensive, they offer no safeguards against leaks and, for these various reasons, their scope is limited.

This invention, whose aim is to obviate all such disadvantages, consists in casting the headers round the ends of the tubes or pipes constituting the units of the heat exchange apparatus. Said ends are preferably provided with collars or other projecting parts adapted to be incorporated in the metal of the headers.

A joint adapted to meet the severest tests of strength, tightness and safety can thus be made conveniently and cheaply, said joint being furthermore wholly independent of the shape of the members to be joined, since it applies equally well to tubes and pipes of circular cross-section or to elements of any other cross-section, wherefore the latter may be given the most suitable shape, in regard to heat exchange or to other conditions obtaining.

The accompanying drawing illustrates, by way of example, a few constructional embodiments of devices according to the invention.

Fig. 1 is a section, on line I—I of Fig. 2, of a fragment of a header joined to ribbed pipe units;

Figs. 2 and 3 are cross-sections on lines II—II and III—III of Fig. 1, respectively;

Figs. 4, 5 and 6 illustrate some of the sections which may be given to the tubular units and Figs. 7 and 8 are cross-sections, similar to Figs. 2 and 3, of a header to which tubes having a flattened cross-section are connected.

In the various figures of the drawing, $a$ denotes the header, $b$ the tubular units, $c$ the ribs made integral with said tubes in any suitable manner, and $d$ a nozzle to connect the header with the supply of the fluid used. Said nozzle may be strengthened by means of a stiffening band $f$ (Figs. 1 and 2) or replaced by an inwardly threaded nipple $g$ (Fig. 7).

The header may be formed of any metal adapted to be cast, such especially as aluminium or magnesium or alloys thereof. Before the metal is cast, the requisite number of ends of tubes $b$ are inserted into the mould, together with the stiffening band $f$ or threaded nipple $g$, if desired, and cores are so arranged as to bound the inner chamber of the header and to ensure that it communicates with the interior of the tubes. To strengthen the joint between the header and the tubes, the ends of the latter are fitted with collars $e$ or are fashioned in any other suitable manner, such as by threading, fluting, flaring or upturning, for example.

Figs. 1 to 3 illustrate the application of the invention to tubes of circular cross-section, but the tubes used may be of any other suitable cross-section such, for example, as those shown at $b_1$, $b_2$ and $b_3$ in Figs. 4, 5 and 6 respectively. Figs. 7 and 8 are cross-sectional views of a header provided with tubes $b_1$ of elongated cross-section as illustrated in Fig. 4.

Other modifications of shape or construction may, of course, be made to the devices illustrated without departing from the scope of the invention, and the header may itself be so shaped as to act as a heat exchange surface.

I claim:

1. In a heat exchange apparatus, the combination of a cast metal header, tubular units having flanged ends, said flanged ends being wholly embedded in the metal of said header, a connecting nozzle integral with said header, and a stiffening band embedded in the metal forming said nozzle.

2. In a heat exchange apparatus, the combination of a cast metal header, tubular units having flanged ends, said flanged ends being wholly embedded in the metal of said header, a connecting nozzle integral with said header, and an internally threaded liner embedded in the metal forming said nozzle.

ROBERT MAUTSCH.